Dec. 18, 1962   J. H. WERNIG   3,069,197
AUTOMOBILE DOOR CONSTRUCTION
Filed April 15, 1960   6 Sheets-Sheet 1

INVENTOR.
James H. Wernig
BY
Herbert Furman
ATTORNEY

Dec. 18, 1962  J. H. WERNIG  3,069,197
AUTOMOBILE DOOR CONSTRUCTION
Filed April 15, 1960  6 Sheets-Sheet 2

INVENTOR.
James H. Wernig
BY
Herbert Freeman
ATTORNEY

Dec. 18, 1962  J. H. WERNIG  3,069,197
AUTOMOBILE DOOR CONSTRUCTION
Filed April 15, 1960  6 Sheets-Sheet 4

INVENTOR.
James H. Wernig
BY
Herbert Furman
ATTORNEY

Dec. 18, 1962
J. H. WERNIG
3,069,197
AUTOMOBILE DOOR CONSTRUCTION
Filed April 15, 1960
6 Sheets-Sheet 5
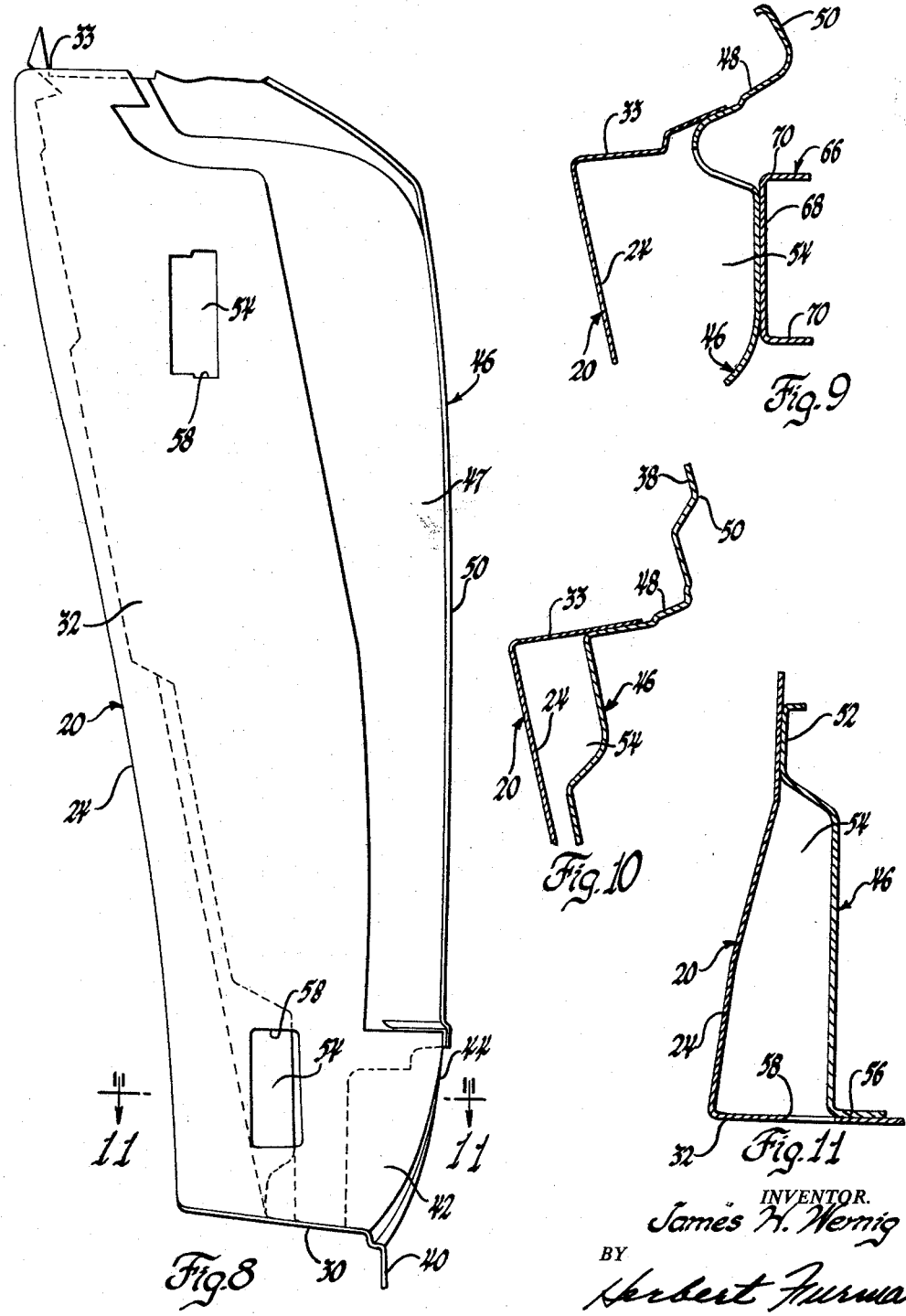
INVENTOR.
James H. Wernig
BY
Herbert Furman
ATTORNEY

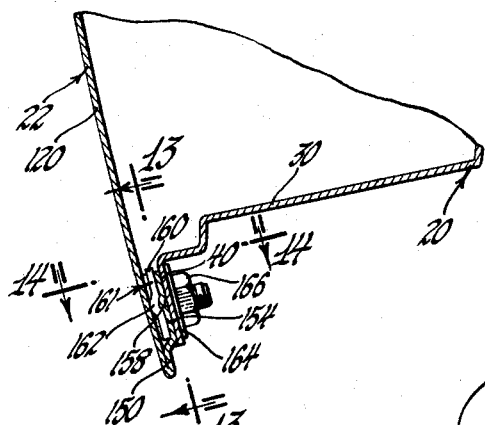
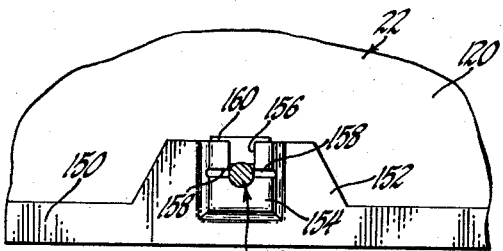
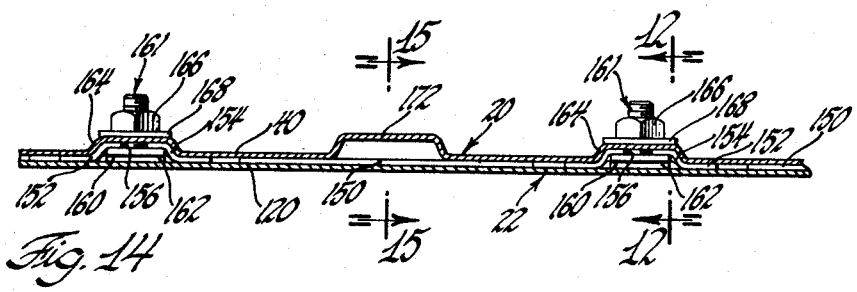
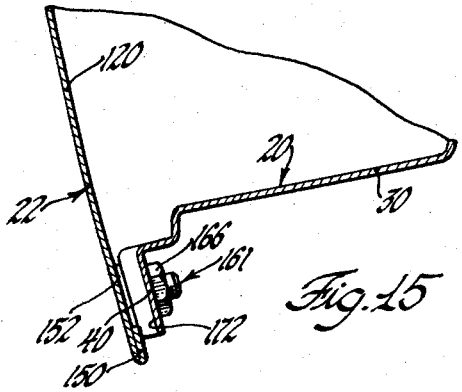
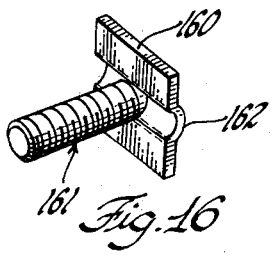

3,069,197
AUTOMOBILE DOOR CONSTRUCTION
James H. Wernig, Birmingham, Mich., assignor to General Motors Corporation, Detroit, Mich., a corporation of Delaware
Filed Apr. 15, 1960, Ser. No. 22,477
5 Claims. (Cl. 296—44)

This invention relates generally to door structures and more particularly to an improved vehicle body door structure.

At the present time substantially all vehicle body door structures include a door inner panel having an outwardly extending flange at the front and rear sides and bottom thereof which terminates in a short laterally extending terminal flange. The door outer panel includes a flange at the front and rear sides and bottom thereof which is bent over the short terminal flange on the door inner panel and welded to the inner face thereof to fixedly secure the panels together and complete the door structure. The door is mounted on the body by inserting the door hinges through openings in the door hinge pillar wall and thereafter bolting the hinges to the hinge pillar. In order to permit the hinges to be bolted to the inner face of the hinge pillar, the inner panel is provided with hinge access openings so that the installer can insert the bolts and his tool through these openings and into the interior of the door. Since the door must be mounted on the body and adjusted with respect to the body door opening only when the door is in an open position, the door must be opened and closed numerous times before it is properly installed. Additionally, the securing of the door to the hinges from the interior of the door requires the installer to work under somewhat adverse conditions.

Various door hardware, such as the window regulator mechanism and guides, the ventipane assembly, and the lock mechanisms, is installed on the outer face of the inner panel after being inserted through one or more large hardware access openings. This installation must be done while the door is in open position, and additionally any adjustment must be made in the open position of the door so that the door must be opened and closed numerous times before the door windows and the door locks are properly installed. Again, the installer must work under somewhat adverse conditions.

The hardware access openings present particularly troublesome sealing problems in sealing the inner panel so as to prevent water from escaping through the openings and staining or otherwise damaging the interior door trim. The access openings are sealed by cover plates secured to the inner panel around the openings, or by paper or other flexible liners of substantially the shape of the inner panel which are removably secured thereto.

The improved door structure of this invention eliminates many of the sealing and installation disadvantages of present door structures, and additionally has several distinct and unique advantages. In the subject door structure, the door inner panel is provided with a continuous outwardly extending flange at the sides and bottom thereof which merges into a short laterally extending terminal flange. The outer panel is provided with a short return bent mounting flange which seats against the outboard face of the terminal flange of the door inner panel and is removably secured thereto by screws or the like which extend through the mating flanges. Thus, the outer panel is completely removable relative to the inner panel whenever desired.

Since the outer panel is removable from the inner panel, there is no need to provide any access openings in the inner panel since the door hardware can be directly mounted on the outer face of the inner panel from the outboard side thereof. In order to accomplish this, various mounting bolts or nuts can be welded or otherwise secured to the inner panel to provide the mounting means. This provides a very distinct advantage over present door structures since it allows the door hardware to be mounted on the inner panel when the door is closed. Thus, the hardware can be mounted and adjusted while the door remains in closed position so as to materially reduce installation time and additionally allow the installer to operate under very favorable conditions rather than under adverse conditions as in current practice.

Another distinct advantage of the subject door structure is to permit the door to be mounted on the body and adjusted while the door is in a closed position. Thus, the entire inner panel can be accurately fitted within the body door opening by a fixture and thereafter secured to the door hinges without need of any further adjustment and without requiring the door to be opened and closed numerous times as in current practice. Thus, installation time is materially reduced and the installer works under very favorable conditions.

Since the inner panel does not contain any large access openings which must be sealed, the time and material costs necessary to apply the numerous plates, liners, sealers, and plugs are materially reduced, and, additionally, the likelihood of any water leaks through the inner panel to the interior door trim is diminished.

Another important advantage of the subject door structure is to permit the completed bodies to be water tested and to permit corrective adjustments of the door and of the door hardware to be easily and quickly made before the outer panels are installed.

Another distinct advantage lies in the materially reduced time and costs required for repairs or replacement of the door hardware since the hardware is easily accessible to the mechanic by merely removing the outer panel.

A further distinct advantage occurs in the event of an accident or collision which damages the door outer panel. The outer panel can be easily replaced with a minimum expenditure of time. This will materially reduce the cost to the owner of the vehicle, since an entirely new door need not be trimmed and fitted to the body and the door hardware need not be removed from the damaged door and installed on a new door.

Another distinct advantage of the subject door structure is in eliminating the time and cost required to metal finish the outer panel so as to obliterate the spot welding marks thereon which occur when the inner and outer panel are welded together.

Further, the door inner and door outer panels of the subject door structure can be painted both inside and outside prior to assembly to reduce corrosion possibilities to a minimum.

Another important advantage of the subject door structure lies in the savings in shipping costs between the manufacturing plant and the assembly plant. Since the door inner and outer panels could be shipped separately, the panels could be nested within each other so as to result in a greater number of panels being placed within the same amount of shipping space than a smaller number of complete door assemblies.

Additionally, since the same door outer panel is often used for several body styles of the same vehicle or for different vehicles, each having different exterior moldings requiring different mounting provisions, the door outer panels for all vehicles could be manufactured in one plant, shipped to various assembly plants without any mounting provisions, and then having the assembly plants add the mounting provisions to the door outer panels as required by manufacturing schedules. This would eliminate many material and assembly control problems.

Thus, the subject door structure permits the door to be easily and quickly mounted on the body, permits the door hardware to be easily and quickly installed on the door, and additionally provides important savings to the owner of the vehicle in the event of a collision or the need for adjustment or replacement of the door or door hardware.

These and other important advantages of the door structure of this invention will be readily apparent from the following specification and drawings wherein:

FIGURE 8 is an enlarged sectional view taken generally along the plane indicated by line 8—8 of FIGURE 2;

FIGURE 9 is an enlarged sectional view taken generally along the plane indicated by line 9—9 of FIGURE 2;

FIGURE 10 is an enlarged sectional view taken generally along the plane indicated by line 10—10 of FIGURE 2;

FIGURE 11 is an enlarged sectional view taken generally along the plane indicated by line 11—11 of FIGURE 8;

FIGURE 12 is a view similar to FIGURE 7 and showing an alternate means of securing the door outer panel to the door inner panel;

FIGURE 13 is a view taken generally along the plane indicated by line 13—13 of FIGURE 12;

FIGURE 14 is a view taken generally along the plane indicated by line 14—14 of FIGURE 12;

FIGURE 15 is a sectional view taken generally along the plane indicated by line 15—15 of FIGURE 14; and FIGURE 16 is an enlarged perspective view of a portion of FIGURE 12.

Figure 1:
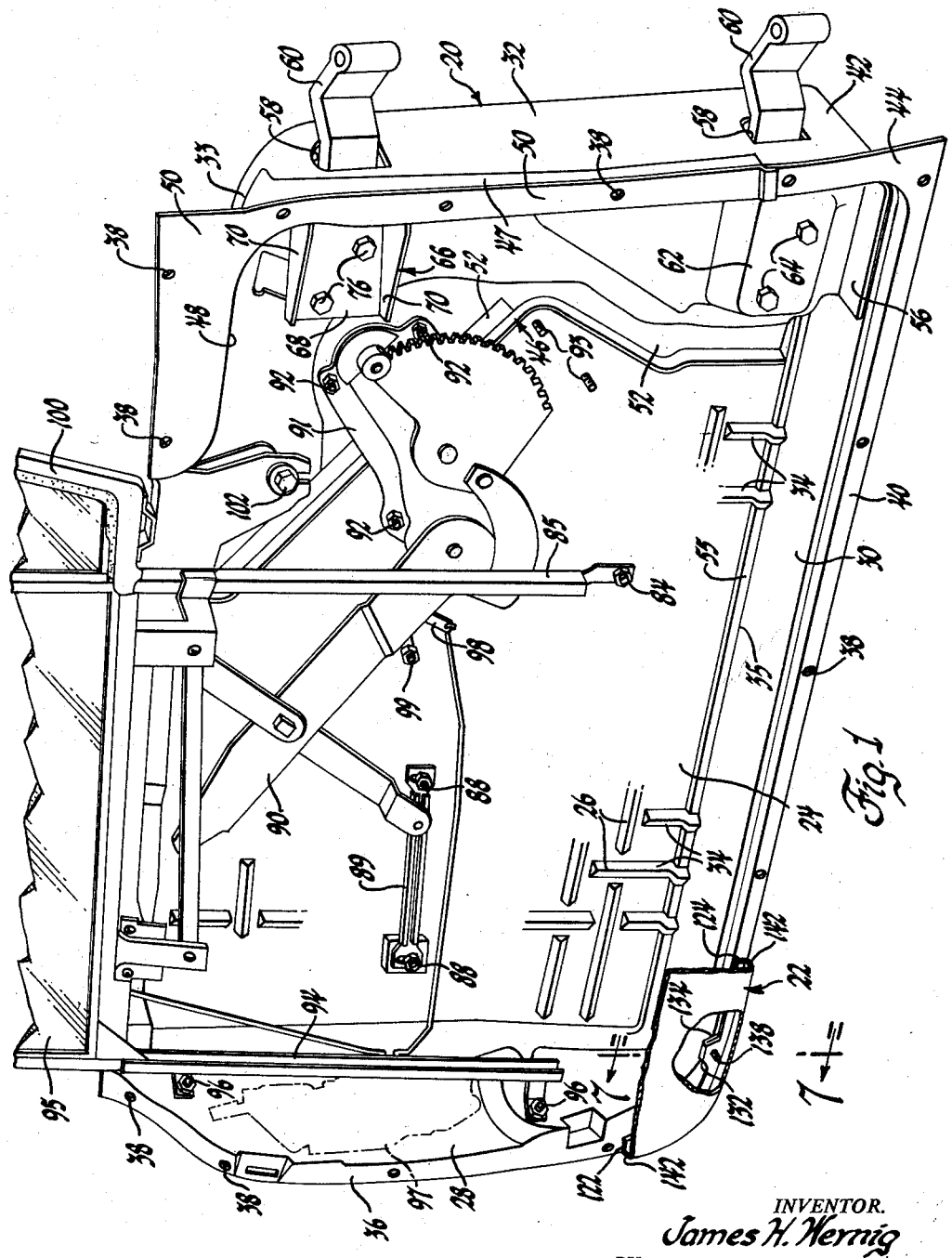
FIGURE 1 is a partially broken away perspective view of a door inner panel according to this invention having the door hardware mounted thereon.

Referring now particularly to FIGURE 1 of the drawings, the subject door structure generally comprises a door inner panel 20 which mounts the door hardware and is secured to the door hinges and a readily removable door outer panel 22 removably secured to the inner panel, as will be further described. The inner panel 20 includes a panel 24 forming the main body of the inner panel and having a plurality of outwardly embossed laterally and longitudinally extending strengthening ribs 26 shown in detail in FIGURE 2. Ribs 26 are generally normal to each other so as to strengthen the panel 24 against torsional bending and oilcanning and also strengthen the inner panel 20. Panel 24 further includes a laterally outwardly extending flange 28 at the rear edge thereof which provides the door lock pillar wall, a downwardly and laterally outwardly extending flange 30 at the lower edge thereof which provides the bottom wall of the door, a laterally outwardly extending flange 32 at the front edge thereof which provides a portion of the door hinge pillar wall, as will be described, and a laterally outwardly extending flange 33 at the upper edge thereof, FIGURES 4, 8, 9, and 10. Flanges 28, 30, 32, and 33 are formed integral with panel 24. As best shown in FIGURE 1 of the drawings, the lower laterally extending strengthening beads 34 interrupt the rabbeted juncture 35 between the panel 24 and the lower flange 30 thereof in order to strengthen flange 30 and the inner panel 20. A short laterally extending terminal flange 36 is formed integral with flange 28 and is apertured at a number of places at 38. Flange 36 merges into a like flange 40 formed integral with flange 30 and likewise apertured at a number of places. Only the lower portion 42 of flange 32 is of the same general depth as flanges 28 and 30, and this lower portion includes an integral flange 44 similar to flange 36 and merging into flange 40.

A hinge pillar member 46 extends between panel 24 and flanges 30, 32, and 33. Member 46 includes laterally extending flanges 47 and 48 which are respectively secured to and carry flanges 32 and 33 outboard of the panel 24 so as to make the combined flanges 32, 47, 33, and 48 of generally the same depth as flanges 28 and 30. Member 46 further includes a short lateral terminal flange 50 which is apertured at 38 and continues flanges 36, 40 and 44 upwardly along the hinge pillar wall of the inner panel, with the lower end of flange 50 overlapping and being welded to flange 44. The inner flanged edge portion 52 of member 46 is welded to panel 24, with the remainder of the hinge pillar member being offset outwardly of the panel 24 so that the hinge pillar member and panel 24 provide a pocket 54 therebetween.

As best shown in FIGURE 1 of the drawings, member 46 includes a lower lateral flange 56 secured to flange 30 and to flange 32 inwardly of flange 44.

Figure 2:
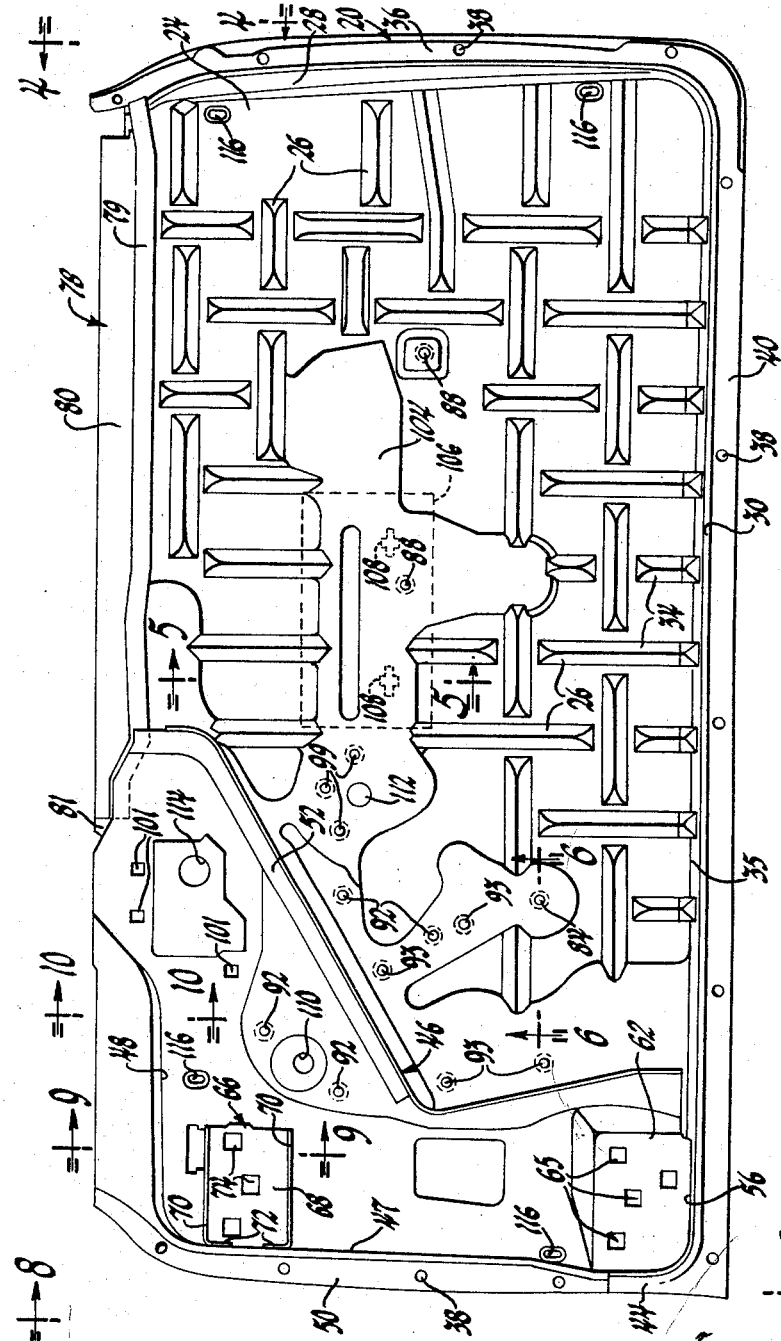
FIGURE 2 is a detailed view of an inner panel according to this invention without the door hardware.

As best shown in FIGURE 8 of the drawings, the flange 32 is provided with upper and lower openings 58 which open to the pocket 54 and which are adapted to receive therethrough the free ends of the gooseneck hinge arms 60 of the door hinges as shown in FIGURE 1. The hinge pillar member 46 is outwardly embossed at 62 to provide a pocket receiving the free end of the lower hinge arm 60 with this hinge arm being bolted to the hinge pillar member by a number of bolts 64 which extend through apertures 65, FIGURE 2, in the embossment 62 and are threaded into the lower hinge arm. A U-shaped reinforcing bracket 66 has the base 68 thereof welded to the hinge pillar member and the legs 70 thereof terminating in short lateral flanges 72 which are welded to the flange 47 of the hinge pillar member 46 as best shown in FIGURE 2. Bracket 66 and the hinge pillar member are apertured at 74 so as to receive bolts 76 therethrough which secure the upper hinge arm 60 to the hinge pillar member and to the bracket 66. A beltline angle brace 78, FIGURES 2 and 4, has one leg 79 thereof welded to panel 24 and the other leg 80 thereof welded to an upwardly extending flange 81 which is integral with the laterally outwardly extending flange 33 of panel 24. The forward end of leg 79 is overlapped by and secured to the hinge pillar member 46 and the rearward end of the leg includes a flange 82 welded to flange 28 of the panel 24.

Figure 6:
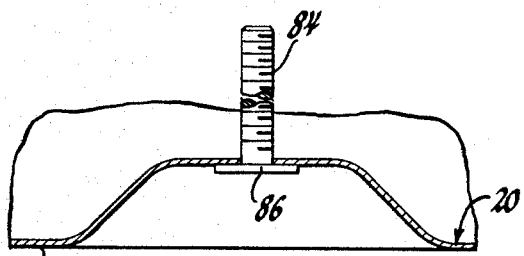
FIGURE 6 is an enlarged sectional view taken generally along the plane indicated by line 6—6 of FIGURE 2.

Referring now to FIGURES 1, 2, and 6 of the drawings, the manner in which the door hardware is mounted on the inner panel 20 will be described. An outwardly extending headed stud 84 and nut provide the mounting means for the lower end of the division post channel 85. The stud extends through an opening in panel 24, with the head 86 of the stud engaging the inner surface of the panel 24 and being welded or otherwise rigidly secured thereto so that the panel 24 is sealed around the stud. A pair of like studs 88 and nuts adjustably mount the lower cam channel 89 of a manual window regulator mechanism 90 on panel 24. The back plate 91 of the window regulator mechanism is mounted on the hinge pillar member 46 and panel 24 by like studs 92 and nuts, with other like studs 93 being provided for a back plate of an electric window regulator mechanism, not shown, which may be used in place of the manual window regulator mechanism. The rear guide channel 94 for the door window 95 is mounted on the flange 28 by a pair of like studs 96 and nuts. Channel 94 is part of the door window frame assembly which includes the division post channel 85. A door lock mechanism 97, of known type, is indicated schematically in FIGURE 1, and it will be understood that this lock mechanism is mounted in a conventional manner on the flange 28 intermediate the studs 96. The remote handle control 98 of the lock mechanism is mounted on the panel 24 by a number of like studs 99 and nuts. The ventipane window assembly 100 is mounted on hinge pillar member 46 by a number of caged nuts, not shown, secured within openings 101 and receiving bolts 102.

Figure 5:
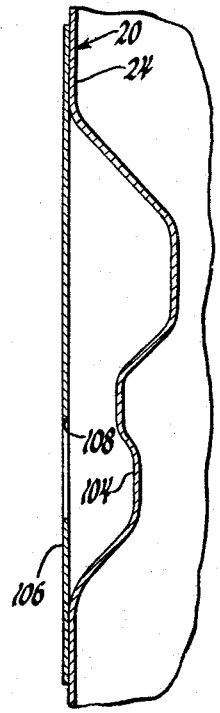
FIGURE 5 is an enlarged sectional view taken generally along the plane indicated by line 5—5 of FIGURE 2.

Panel 24 is outwardly embossed at 104, FIGURES 2 and 5, with this embossment being closed by a plate 106 secured to the inner surface of the panel 24 around the embossment. The plate 106 is provided with a pair of cruciform openings 108 which are intended to receive the mounting means for the door arm rest in order to mount this arm rest on the panel 24.

From the foregoing description, it can be seen that the studs and caged nuts allow the door hardware to be mounted on the inner panel 20 from the outboard side thereof, and further that no large access openings are necessary or need be provided in the inner panel in order to mount the door hardware thereon.

The openings 110, 112, and 114 for the window regulator mechanism, remote handle mechanism, and ventipane window mechanism, respectivey, are the only openings in the panel 24 to the interior of the body. These openings are necessary in order to allow the drive shafts of the various mechanisms to project through the panel and be secured to the interior operating handles. The openings are as small as possible, and are very easily sealed. Thus, this invention provides an inner panel which has no large openings whatsoever whereby the possibility of water leakage to the interior of the body through the inner panel is remote.

The inner panel 20 shown in FIGURE 2 can be very easily mounted on a vehicle body within the door opening thereof as will now be described. In the usual vehicle body, the door hinges are secured to the body hinge pillars prior to the time that the doors are mounted on the body. In mounting the inner panel 20 of this invention on the body, the inner panel is first placed in a suitable fixture, and it will be noted that the panel 24 and hinge pillar member 46 are each provided with inward depressions 116 which act as locating means so that the inner panel 20 can be accurately located with respect to the fixture, and mounted thereon. Thereafter, the hinge arms 60 are inserted in openings 58 and the fixture is accurately located with respect to the body door opening to fixedly locate panel 20 within the body door opening in door closed position. The bolts 64 and 76 are then inserted through the openings 65 and 74, respectively, so as to easily and quickly mount the inner panel 20 on the body and also accurately locate the inner panel 20 with respect to the door opening without need of any further adjustment. This mounting of the inner panel 20 on the body is accomplished entirely from the exterior of the body in door closed position and there is usually no further need for adjustment of the inner panel 20 within the door opening since the fixture accurately locates the inner panel 20 prior to the inner panel being secured to the door hinges. The fixture can then be removed from the inner panel 20.

Thereafter, the window regulator mechanism 90, and the entire door window assembly including the ventipane window assembly 100, the rear guide channel 94 and division post channel 85, and the window 95 can be easily and quickly mounted on the inner panel 20 and adjusted with respect to the body door opening entirely from the exterior of the body, while the inner panel 20 remains in door closed position within the body door opening. This is easily accomplished with a minimum expenditure of time, since the installer works from the exterior of the body and under very favorable conditions. The lock mechanism 97 can also be installed from the exterior of the body by providing suitable studs on the flange 28 similar to the studs 84 so as to mount the lock frame on the flange 28, with the bolt and bolt housing projecting through flange 28 into engagement with the striker on the body lock pillar. The remote handle control 98 can then be installed from the exterior of the body. Thereafter, the body can be given a water test, and if any adjustments of the window regulator mechanism or ventipane window assembly are necessary, these are very easily and quickly accomplished.

Figure 3:
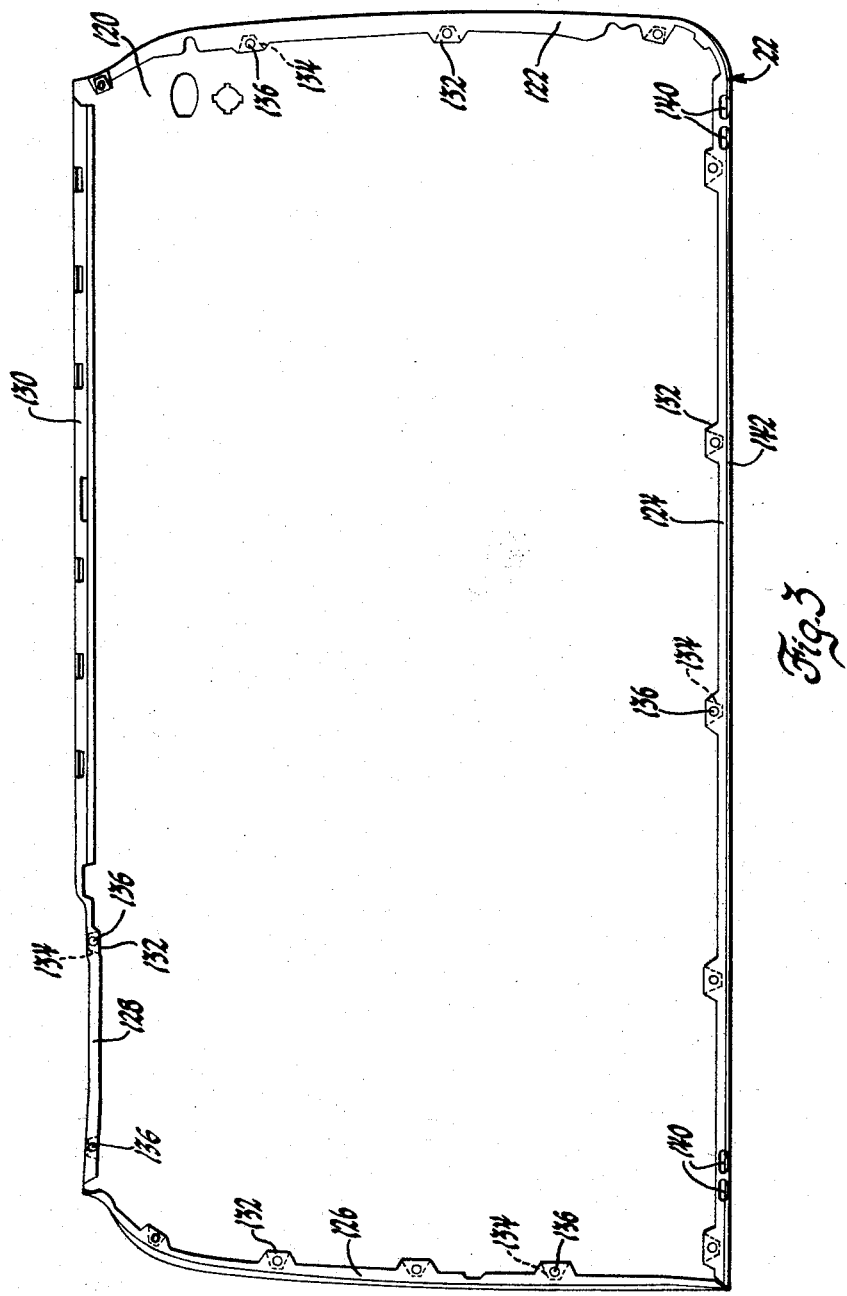
FIGURE 3 is a view of an outer panel according to this invention.
Figure 4:
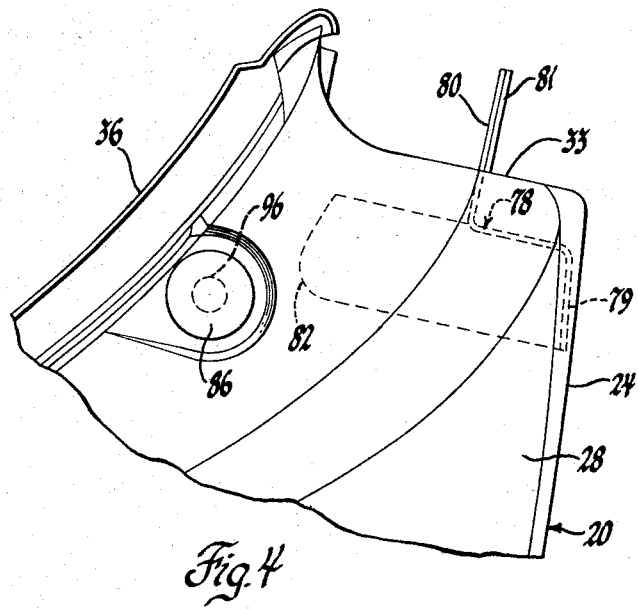
FIGURE 4 is an enlarged view taken generally along the plane indicated by line 4—4 of FIGURE 2.
Figure 7:
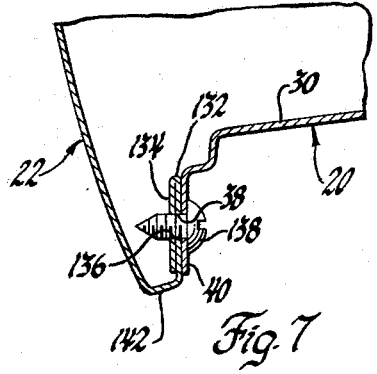
FIGURE 7 is an enlarged sectional view taken generally along the plane of line 7—7 of FIGURE 1.

Referring now particularly to FIGURE 3 of the drawings, the outer panel 22 includes a main panel 120 which is provided with a return bent flange 122 at the rearward edge thereof, a like flange 124 at the bottom edge thereof, and a like flange 126 at the forward edge thereof. The upper edge of the panel 120 is also provided with a return bent flange 128 similar to flanges 122, 124, and 126, and a return bent apertured flange 130. As best shown in FIGURES 3 and 7 of the drawings, each of the flanges 122, 124, 126, and 128 is provided with a number of inwardly extending tabs 132, the terminal portions 134 of which are bent back underneath the body of the tabs with the portion 134 and the body of the tabs being apertured at 136. The apertures 136 correspond and are complementary to the apertures 38 of the flanges 36, 40, and 50 of the door inner panel 20. Whenever it is desired to mount the outer panel on the inner panel, the flanges 122, 124, 126, and 128 are fitted against the flanges 36, 40 and 50, respectively, and sheet metal screws 138 are used to secure tabs 132 to the flanges of the inner panel as shown in FIGURE 7. Further, as shown in FIGURE 3, elongated drain openings 140 are provided in the flange 124 and the juncture flange 142 between flange 124 and panel 120 drain any water from the interior of the assembled door to the outside of the body.

The flange 142 also interconnects flanges 122, 126, 128, and 130 with panel 120. The flange 130 is spaced from the leg 80 of the beltline brace 78 so as to define therewith an opening to the interior of the door for the door window 95 and for the ventilation window assembly 100.

Whenever it is desired to remove the outer panel 22, the screws 138 are removed and then the outer panel 22 can be removed so as to provide complete and free access to the door hardware and the door hinges. Likewise, if the outer panel 22 is damaged in an accident or otherwise, it can very easily be replaced with minimum cost.

Referring now particularly to FIGURES 12 through 15 of the drawings, an alternate means of mounting the outer panel 22 on the inner panel 20 will be described with like numerals being used for parts previously described. The outer panel 22 is provided with a return bent flange 150 which corresponds to flanges 122, 124, 126, and 128 and which includes a number of spaced extensions 152. The flange 150 and the extensions 152 thereof bear against the inner face of panel 22 so as to provide a double thickness folded flange rigidifying the edges of the panel. As best shown in FIGURES 13 and 14 of the drawings, the extensions 152 are provided with inwardly embossed generally square shaped pockets 154, each of which includes a slot 156 and a pair of outwardly embossed ribs 158 extending laterally to the slot adjacent the inner closed end thereof. The pocket 154 receives the head 160 of a bolt 161, the details of which are shown in FIGURE 16. As shown therein, the head 160 of the bolt includes an embossed rib 162 which opens toward the shank of the bolt. The head 160 of the bolt fits within the pocket 154, with the outer face of the rib 162 engaging the inner surface of panel 22 and with the inwardly embossed ribs 158 of the pocket being received within the rib 162. The shank of the bolt is received within the slot 156 and is located adjacent the inner closed end of the slot when the bolt head is inserted within the pocket 154.

The flange 40 of the inner panel 20, as well as flanges 36, 44, and 50, is provided with inwardly embossed spaced apertured pockets 164 which correspond and are complementary to the pockets 154 and mate with the pockets 154 when the outer panel is mounted on the inner panel. The shanks 160 of the bolts extend through the apertures of the pockets 164, and a nut 166 and washer 168 secure the pockets together.

At spaced locations along the lower edge of the door, other outwardly embossed pockets 172 are provided in the flange 40 so as to provide drain openings for the interior of the door.

Thus, the improved door structure of this invention eliminates many of the sealing and installation disadvantages of present door structures, and additionally has several distinct and unique advantages. The door hardware can be easily mounted and adjusted on the inner panel from the exterior of the body and in door closed position so as to materially reduce installation time and cost and permit the installer to operate under very favorable conditions. Additionally, the inner panel can be easily mounted on the body by a suitable fixture and at the same time can be adjusted prior to being secured to the door hinges for a more accurate fit of the inner panel within the body door opening. Likewise, the body and assembled inner panel and door hardware can be subjected to a water test and any minor adjustments necessary made prior to the installation of the outer panel.

I claim:

1. A vehicle body door structure, comprising, in combination, a door inner panel structure providing the main lower portion of said door structure, said inner panel including a continuous integral outwardly extending flange at the sides and bottom thereof merging into a laterally extending terminal flange, a door outer panel generally coextensive with said inner panel, said outer panel including a return bent mounting flange generally coextensive with said inner panel terminal flange, the inboard face of said mounting flange mating with and seating against the outboard face of said inner panel terminal flange in face-to-face relationship therewith, and securing means removably securing said mounting flange to said terminal flange to removably mount said outer panel on said inner panel, said securing means including a fastener having a head member and a shank adapted to extend through apertures in said mounting flange and in said terminal flange and to releasably receive a nut member thereon, one of said members being located between the outboard face of said mounting flange and the inboard face of said outer panel and the other of said members being located adjacent the inboard face of said terminal flange.

2. A vehicle body door structure, comprising, in combination, a door inner panel structure providing the main lower portion of said door structure, said inner panel including a continuous integral outwardly extending flange at the sides and bottom thereof merging into a laterally extending terminal flange, a door outer panel generally coextensive with said inner panel, said outer panel including a return bent mounting flange spaced inwardly from said outer panel and being generally coextensive with said inner panel terminal flange, the inboard face of said mounting flange mating with and seating against the outboard face of said inner panel terminal flange in face-to-face relationship therewith, securing means removably securing said mounting flange to said terminal flange to removably mount said outer panel on said inner panel, said securing means including a fastener having a head member and a shank adapted to extend through apertures in said mounting flange and in said terminal flange and to releasably receive a nut member thereon, one of said members being located between the outboard face of said mounting flange and the inboard face of said outer panel and the other of said members being located adjacent the inboard face of said terminal flange, the juncture of said mounting flange and said outer panel at the bottom of said outer panel providing a drain gutter, and drain means located at said juncture to drain any moisture collected therein exteriorly of said door.

3. A vehicle body door structure, comprising, in combination, a door inner panel structure providing the main lower portion of said door structure, said inner panel including a continuous integral outwardly extending flange at the sides and bottom thereof merging into a laterally extending terminal flange, hinge mounting means on said inner panel adjacent one of the side walls thereof, locating means on said inner panel adapted to receive a positioning fixture whereby said inner panel can be accurately positioned within a vehicle body opening and said hinge mounting means can be accurately located with respect to vehicle body door hinges, a door outer panel generally coextensive with said inner panel, said outer panel including a return bent mounting flange generally coextensive with said inner panel terminal flange, said mounting flange mating with and seating against the outboard face of said inner panel terminal flange in face-to-face relationship therewith, and securing means removably securing said mounting flange to said terminal flange to removably mount said outer panel on said inner panel.

4. A vehicle body door structure, comprising, in combination, a door inner panel structure providing the main lower portion of said door structure, said inner panel including a continuous integral outwardly extending flange at the sides and bottom thereof merging into a laterally extending terminal flange, hinge mounting means on said inner panel adjacent one of the side walls thereof, locating means on said inner panel adapted to receive a positioning fixture whereby said inner panel can be accurately positioned within a vehicle body opening and said hinge mounting means can be accurately located with respect to vehicle body door hinges, a door outer panel generally coextensive with said inner panel, said outer panel including a return bent mounting flange spaced inwardly from said outer panel and being generally coextensive with said inner panel terminal flange, said mounting flange mating with and seating against the outboard face of said inner panel terminal flange in face-to-face relationship therewith, securing means removably securing said mounting flange to said terminal flange to removably mount said outer panel on said inner panel, the juncture of said mounting flange and said outer panel at the bottom of said outer panel providing a drain gutter, and drain means located at said juncture to drain any moisture collected therein exteriorly of said door.

5. A vehicle body door structure, comprising, in combination, a door inner panel structure providing the main lower portion of said door structure, said inner panel including a continuous integral outwardly extending flange at the sides and bottom thereof merging into a laterally extending terminal flange, a hinge pillar member extending between said inner panel and one of said side flanges to define a hinge receiving pocket therewith, hinge openings in said one of said side flanges opening to the interior of said pocket, hinge mounting means on said member accessible only from the outboard side of said inner panel, locating means on said inner panel adapted to receive a positioning fixture whereby said inner panel can be accurately positioned within a vehicle body opening and said hinge mounting means can be accurately located with respect to vehicle body door hinges inserted through said hinge openings into said pocket, a door outer panel generally coextensive with said inner panel, said outer panel including a return bent mounting flange generally coextensive with said inner panel terminal flange, said mounting flange mating with and seating against the outboard face of said inner panel terminal flange in face-to-face relationship therewith, and securing means removably securing said mounting flange to said terminal flange to removably mount said outer panel on said inner panel.

References Cited in the file of this patent

UNITED STATES PATENTS

| | | |
|---|---|---|
| 2,566,871 | Bedford | Sept. 4, 1951 |
| 2,797,128 | Renno | June 25, 1957 |
| 2,797,129 | Renno | June 25, 1957 |
| 2,797,130 | Renno | June 25, 1957 |
| 2,867,473 | Gibson | Jan. 6, 1959 |

FOREIGN PATENTS

| | | |
|---|---|---|
| 606,062 | Germany | Nov. 24, 1934 |